United States Patent [19]

Jacobs

[11] Patent Number: 4,924,071

[45] Date of Patent: May 8, 1990

[54] OVEN

[75] Inventor: Sheldon F. Jacobs, Wayzata, Minn.

[73] Assignee: Woodroast Systems, Inc., Wayzata, Minn.

[21] Appl. No.: 70,332

[22] Filed: Jul. 6, 1987

[51] Int. Cl.⁵ .............................................. A21B 1/26
[52] U.S. Cl. ........................................ 219/400; 99/482
[58] Field of Search .............. 219/385, 386, 387, 400, 219/401, 260, 267, 393, 396, 413, 486; 165/918, 919; 99/482, 446; 211/191, 192, 204, 206; 312/264, 265

[56] References Cited

U.S. PATENT DOCUMENTS

| | | | |
|---|---|---|---|
| 1,837,924 | 12/1931 | Rutherford | 126/369.1 |
| 2,568,022 | 9/1951 | Parker | 99/259 |
| 2,722,882 | 11/1955 | Wilson | 99/482 |
| 2,789,877 | 4/1957 | Pfundt | 99/482 |
| 2,842,043 | 7/1958 | Reuland | 99/482 |
| 2,906,191 | 9/1959 | Lee | 99/482 |
| 3,299,800 | 1/1967 | Angelo | 99/417 |
| 3,333,526 | 8/1967 | Kirkpatrick | 99/260 |
| 3,776,127 | 12/1973 | Muse | 99/482 |
| 3,817,166 | 6/1974 | McLain | 99/480 |
| 4,020,322 | 4/1977 | Muse | 219/392 |
| 4,030,476 | 6/1977 | Hock | 219/400 |
| 4,068,572 | 1/1978 | Vogt | 219/400 |
| 4,130,052 | 12/1978 | Jacobson | 219/405 |
| 4,140,049 | 2/1979 | Stewart | 99/483 |
| 4,232,597 | 11/1980 | Perrine et al. | 99/468 |
| 4,300,444 | 11/1981 | Muse | 99/448 |
| 4,344,358 | 8/1982 | Maurer | 99/476 |
| 4,355,570 | 10/1982 | Martin | 219/393 |
| 4,374,489 | 2/1983 | Robbins | 99/482 |
| 4,436,100 | 3/1984 | Green, Jr. | 131/330 |
| 4,467,709 | 8/1984 | Anstedt | 99/482 |
| 4,474,107 | 10/1984 | Cothran | 99/352 |
| 4,495,860 | 1/1985 | Hitch et al. | 99/340 |
| 4,512,327 | 4/1985 | Stiegler | 219/400 |
| 4,554,864 | 11/1985 | Smith et al. | 99/340 |
| 4,730,100 | 3/1988 | Pingelton | 219/386 |

Primary Examiner—Teresa J. Walberg
Attorney, Agent, or Firm—Kinney & Lange

[57] ABSTRACT

An oven for use in a humidistatic roasted cooking process combines heat, smoke and steam in the cooking of food. The oven includes a pair of shelf support members which are removably positioned adjacent inner side walls of the oven housing. Removable spacers hold the shelf support members in spaced apart positions. Cooking racks, a wood tray, and a water pan are supported between opposing flanges of the pair of support members. The support members are spaced from the inner walls of the sides, and define a pair of plenums for permitting air and steam to travel upward between the support member and its adjacent wall and then impinge upon food located on the cooking racks. A heater in the form of a pair of electrical elements are located below the wood tray. An inner element is located immediately below the wood tray, and is maintained on continuously to provide smoke within the oven. The outer heater element is controlled to maintain a predetermined cooking or holding temperature within the oven.

25 Claims, 6 Drawing Sheets

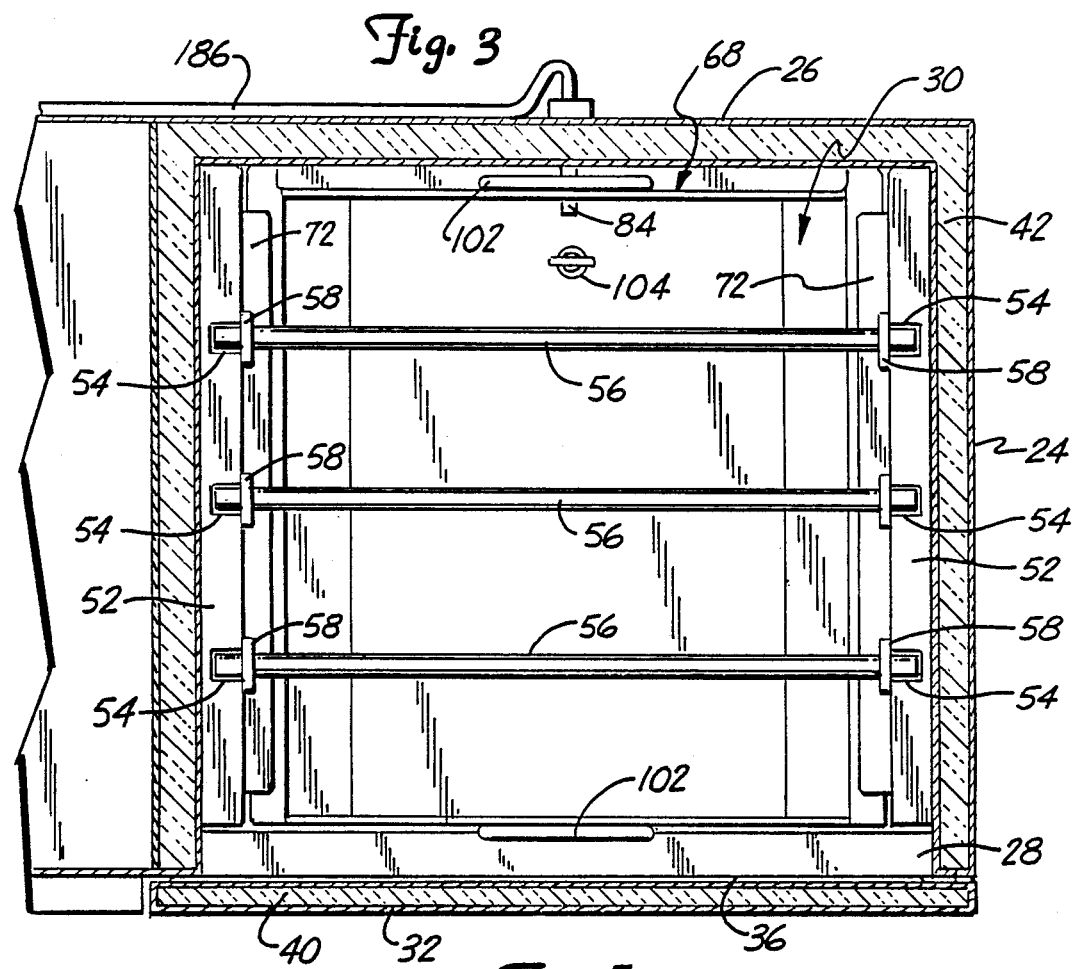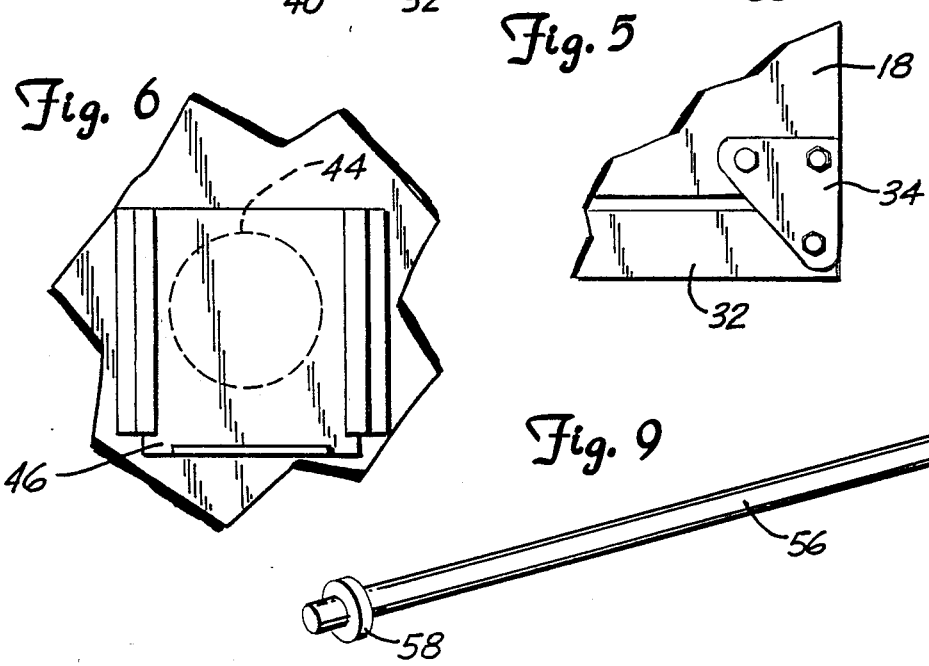

4,924,071

OVEN

BACKGROUND OF THE INVENTION

1. Field of the Invention.

The present invention relates to an oven for cooking and holding meats, fish and fowl. In particular, the present invention is an oven which serves as a smoker, slow roast and holding chamber for various meats and other foods.

2. Description of the Prior Art.

Various cookers have been proposed in the past which can be used to cook and smoke foods. Examples of these types of food cookers or food smokers are shown in the following U.S. Pat. Nos.: Rutherford 1,837,924, Parker 2,568,022, Angelo 3,299,800, Kirkpatrick 3,333,526, Muse 3,776,127, McLain 3,817,166, Muse 4,020,322, Stewart 4,140,049, Perrine et al 4,232,597, Muse 4,300,444, Maurer 4,344,358, Robbins 4,374,489, Green, Jr. 4,436,100, Anstedt 4,467,709, Cothran 4,474,107, Hitch et al 4,495,860 and Smith et al 4,554,864.

There is a continuing need for an oven which is suitable for use in large and small restaurants, which cooks food by a combination of smoke, steam and marinades, and which also can function as a holding chamber after cooking is complete. For restaurant use, the oven must be easily cleaned.

SUMMARY OF THE INVENTION

The oven of the present invention includes a housing having a top, a bottom, first and second parallel sides, and a back and a front door opening. First and second shelf support members are removably positioned within the cooking chamber defined by the housing. The first and second shelf support members are positioned adjacent the first and second sides, respectively. Each support member has a plurality of vertically spaced, horizontally oriented, inwardly projecting flanges.

The first and second shelf support members are held in spaced apart, opposing positions by removable spacer means, which also function as hanging racks. A plurality of cooking racks are supported between the opposing flanges of the first and second shelf support members. Heating means is positioned adjacent the bottom of the chamber.

In preferred embodiments, a wood tray and a water and marinade pan are also supported by flanges of the first and second shelf support members. The wood tray is positioned immediately above the heating means, and the water and marinade pan is positioned above the wood tray.

To provide circulation of smoke, steam and marinade throughout the chamber, the first and second shelf support members are spaced from the first and second sides to define plenums. There is an opening adjacent each flange to permit flow of steam, smoke and marinade out of the plenums and into the main portion of the chamber.

The heating means preferably includes first and second heating elements. The first heating element is positioned immediately below the wood tray, and is maintained "on" continuously during the cooking process to assure that the designated wood supply burns to its end. The amount of wood is premeasured depending on the food load, and it is important that all of the wood is burned in the desired time period. The second heating element is controlled as a function of temperature within the chamber.

BRIEF DESCRIPTION OF THE DRAWINGS

FIG. 3 is a sectional view along section 3—3 of FIG. 1.

FIG. 5 is a detailed view showing the front door hinge.

FIG. 6 is a detailed view showing a vent.

FIG. 9 is a perspective view of a spacer/hanger rod.

DETAILED DESCRIPTION OF THE PREFERRED EMBODIMENTS

Figure 1:
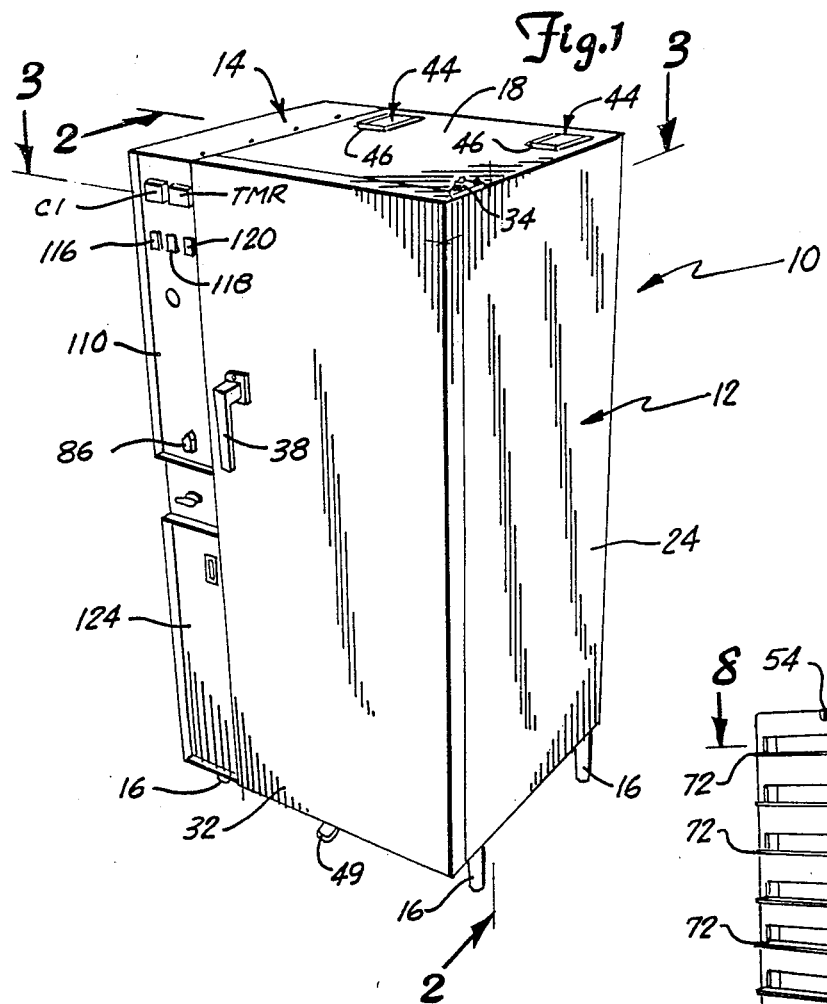
FIG. 1 is a perspective view of a preferred embodiment of the oven of the present invention.

As shown in FIGS. 1-4, oven 10 includes a main housing 12 and a control cabinet 14 which are mounted together in side-by-side relationship. Housing 12 and cabinet 14 are supported by legs 16, which preferably are leveling legs to raise housing 12 about six inches above floor level.

Main housing 12 has a top 18, a bottom 20, a left side wall 22, a right side wall 24, a back wall 26 and a front door opening 28 which define a cooking/holding chamber 30. Front door 32 is mounted by hinges 34 to main housing 12 (see also FIG. 5). Front door 32 pivots about a vertical axis and is capable of opening at least 90° to permit shelf and shelf support removal from chamber 30.

A silicone rubber door seal 36 provides a seal between door 32 and the front edge of housing 12 when door 32 is closed. Seal 36 is preferably a one-piece, double acting bulb type seal with a single joint at the bottom of the door opening.

Door handle 38 is pivotable, and controls a latch mechanism which holds door 32 closed when handle 38 is in the position shown in FIG. 1. The latch mechanism includes both top and bottom door latches, which assures a tight door seal around the perimeter of the door opening.

As shown in FIG. 3, door 32 is preferably a stainless steel door with thermal insulating material 40 (preferably two inches of high grade glass wool) in its interior. Similarly, thermal insulation material 42 (preferably one inch of glass wool) fills the interior of top 18, bottom 20, side walls 22 and 24, and back 26.

Figure 2:
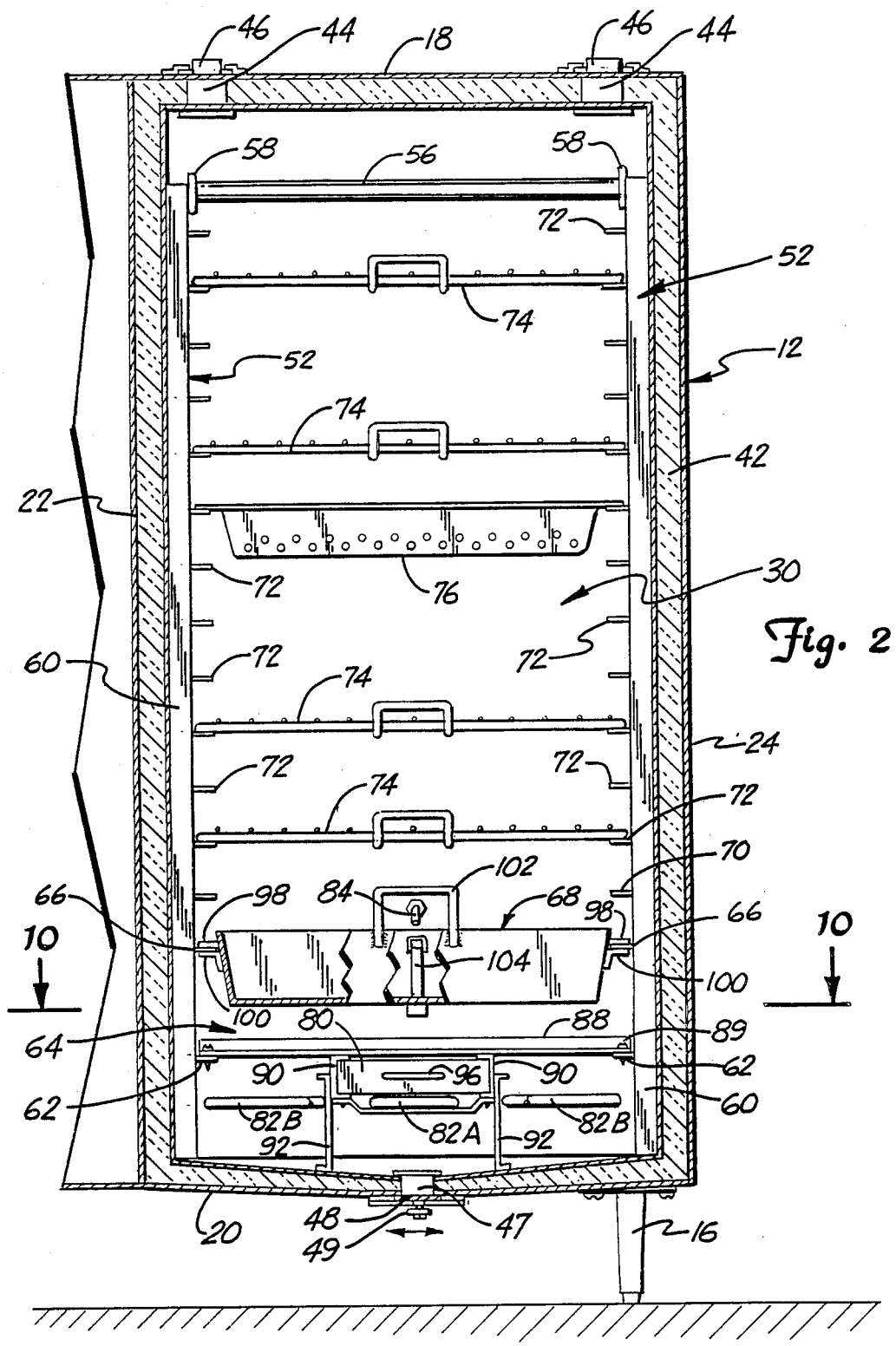
FIG. 2 is a sectional view along section 2—2 of FIG. 1.

Located in top 18 are a pair of exhaust vents 44 of approximately three inch diameter. As best shown in FIGS. 2 and 6, adjustable slide dampers 46 control air flow out of chamber 30 through vents 44.

Figure 4:
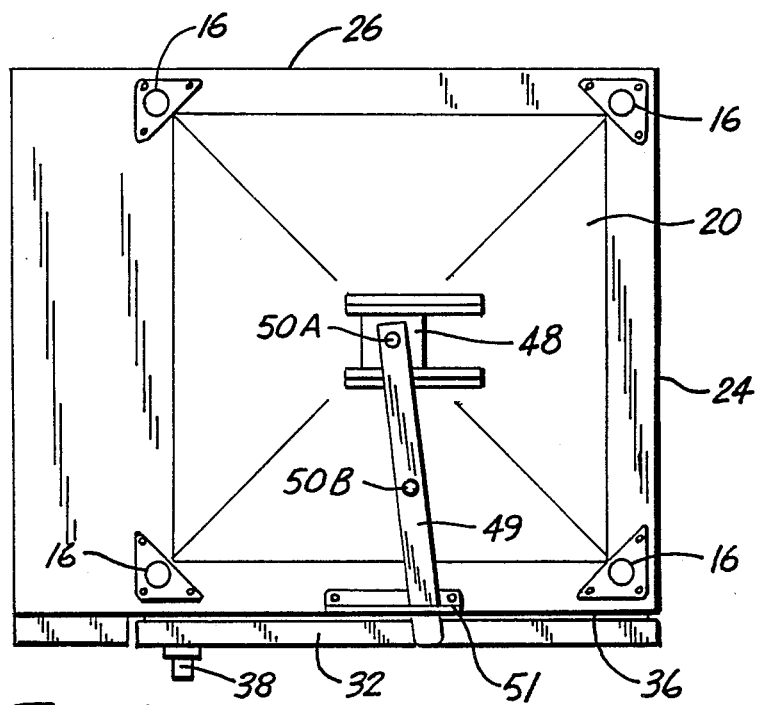
FIG. 4 is a bottom view of the oven.

As shown in FIGS. 2 and 4, located in bottom 20 of main housing vent 12 is a four inch diameter fresh air inlet and floor drain 47 which is controlled by a slidable damper 48 operated by pivotable operator lever 49. Lever 49 is pivotally connected by pin 50A to damper 48 at one end, is pivotally connected by pin 50B to bottom 20 near its center, and has its front end slidably supported by bracket 51.

As shown in FIG. 2, the inner surface of bottom wall 20 is sloped downwardly toward the center, where vent 47 is located. As a result, vent 47 functions both as a drain for liquids which may accumulate at the bottom of chamber 30 during cleaning, and also as a fresh air inlet to chamber 30 during cooking/holding operation.

Chamber 30 in one embodiment, is approximately 25 inches wide, 59 inches high, and 26 inches deep. The door opening is 22 inches by 53 inches. The overall outer dimensions of housing 12 are 30 inches wide, 28 inches deep, and 66½ inches high.

Figure 7:
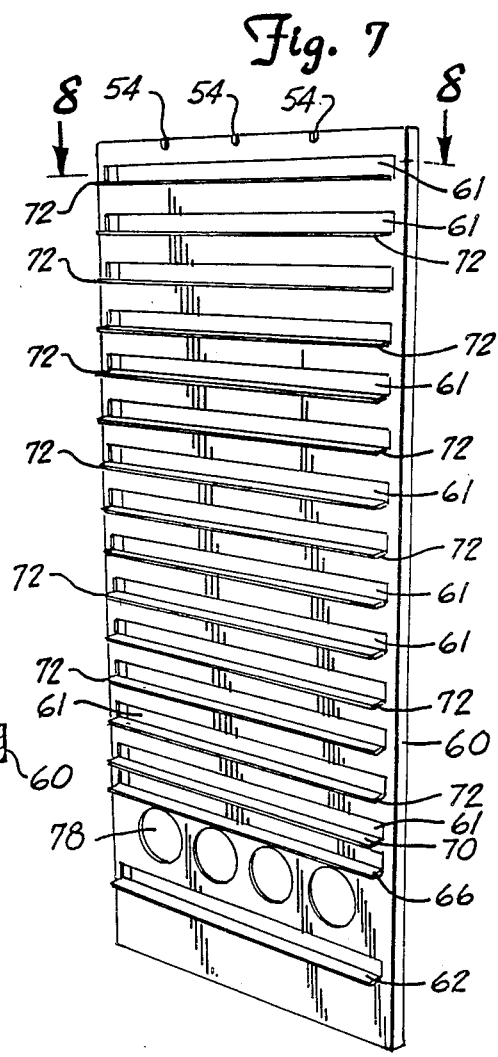
FIG. 7 is a perspective view of one of the shelf support members.
Figure 8:
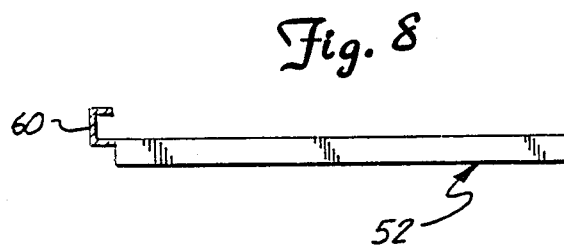
FIG. 8 is a sectional view along section 8—8 of FIG. 7.

Within chamber 30 are a pair of removable shelf supports 52 positioned adjacent left wall 22 and right wall 24. One of the shelf supports 52 is shown in more detail in FIGS. 7 and 8. Shelf supports 52 are sized to fit snuggly within chamber 30. Each shelf support 52 has three notches 54 in its upper edge for receiving spacer/hanger rods and meat hangers 56. Each spacer rod 56 (see FIGS. 2, 3 and 9) is a one-half inch diameter rod with a flange 58 located near each end. The flange 58 engages the upper front edge of the respective shelf supports 52.

Shelf supports 52 are integral members formed preferably from 16 gauge stainless steel. The opposite edges of each shelf support 52 are bent into C-shaped channels 60 to provide an air gap between the main surface of support 52 and the respective side wall 22, 24. This air gap forms and acts as a plenum for the passage of air, steam, smoke and marinade upward and into the main portion of chamber 30.

Each support member 52 has a plurality of horizontal flanges which extend inwardly toward the center of chamber 30. The flanges are formed by a punching operation, so that there are no welds or seams which are difficult to clean. In addition, each flange has associated with it an opening 61 through which smoke, steam, marinade and air can pass.

The lowermost flanges 62 are located approximately 6.25 inches from the bottom of supports 52. Flanges 62 support a wood tray support assembly 64, as shown in FIG. 2. Support assembly 64 will be discussed in greater detail later.

The next flanges 66 are spaced 5.25 inches above flanges 62 and support water pan 68. The next flanges 70 are positioned about 2 inches above flanges 66. The remaining flanges 72 are spaced at 3 inch intervals, and are used to support wire shelves 74 and nut pan 76. The position and selection of wire shelves 74 and nut pan 76 depends, of course, on the particular food being cooked.

In addition to their function as spacers for maintaining shelf supports 52 in spaced apart position, rods 56 also act as hangers from which meat or other foods can be hung for cooking purposes.

Located between flanges 62 and 66 are four circular openings 78. These openings provide a passage for smoke produced by wood held in wood tray 80 to escape and flow upward through the plenums formed by support members 52 and the respective side walls 22 and 24.

Positioned below wood tray 64 are heater elements 82A and 82B. Heater element 82A is located immediately below tray 80, while heater element 82B is located surrounding heater element 82A. During operation, heater element 82A is maintained on continuously to apply heat to wood tray 80 and to the wood located in it. Heater element 82B is controlled by temperature controllers which sense the temperature within chamber 30.

The cooking process performed by oven 10 involves the use of smoke as well as steam and marinade. Water pan 68 holds water and marinade which is heated by heater elements 82A and 82B. Water can be supplied to pan 68 through spigot 84 which is mounted through rear wall 26. A water connection pipe 186 extends along the backside of housings 12 and 14 and connects spigot 84 to manual control valve 86 which is mounted on the front of control housing 14. By turning valve 86, the cook may supply additional water to pan 68 without having to open door 32.

Figure 10:
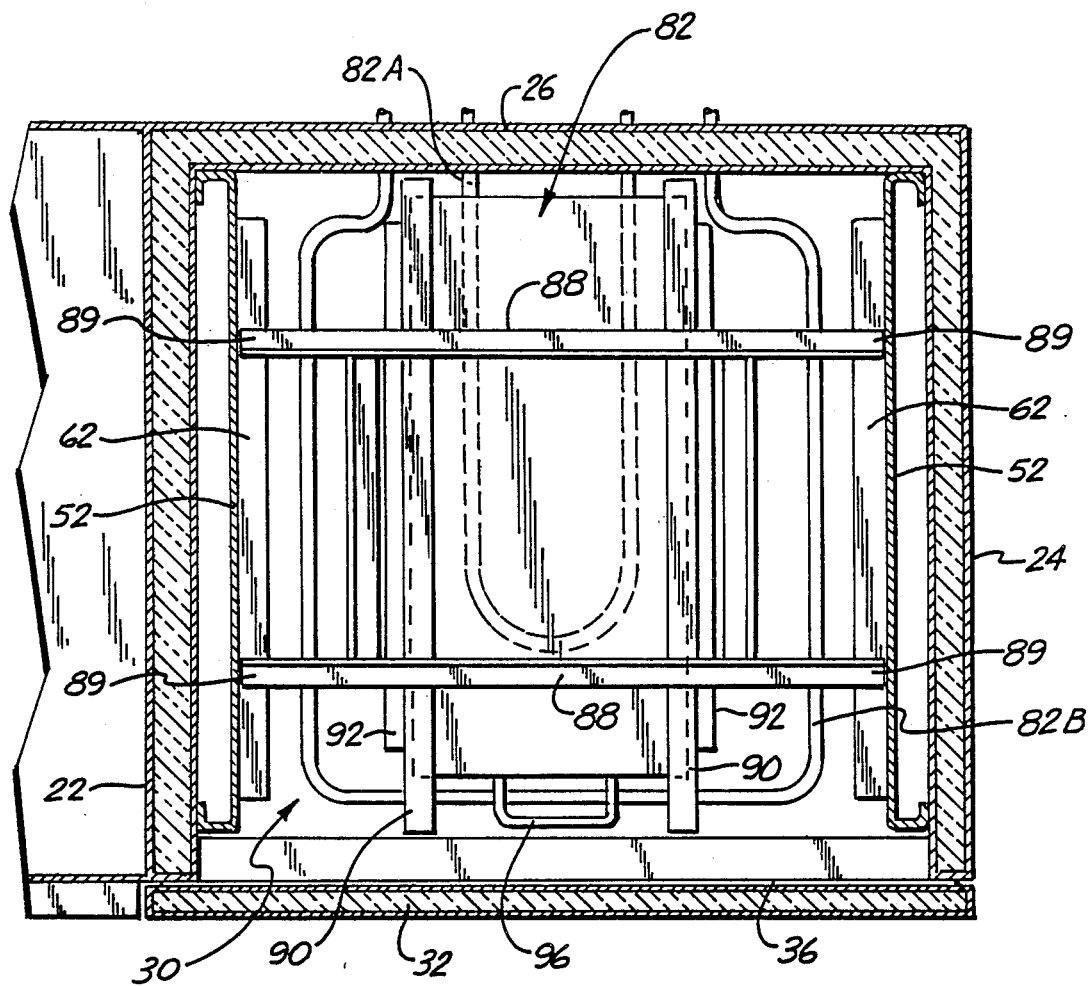
FIG. 10 is a sectional view along section 10—10 of FIG. 2.

Wood tray 80 and tray support 64 are shown in detail in FIGS. 2 and 10. As shown, tray support 64 has a pair of spaced cross bars 88 which are of L-shaped cross-section and which extend between flanges 62 and are connected to flanges 62 by screws 89. Mounted below cross bars 88 are a pair of C-shaped channels 90 which receive and support wood tray 80. Legs 92 extend downward from channels 90 to provide further support. Mounted below channels 90 is heater support 94, which supports heater element 82A immediately below wood tray 80. A handle 96 is connected to wood tray 80 to assist in its removal and insertion into channels 90.

Figure 11:
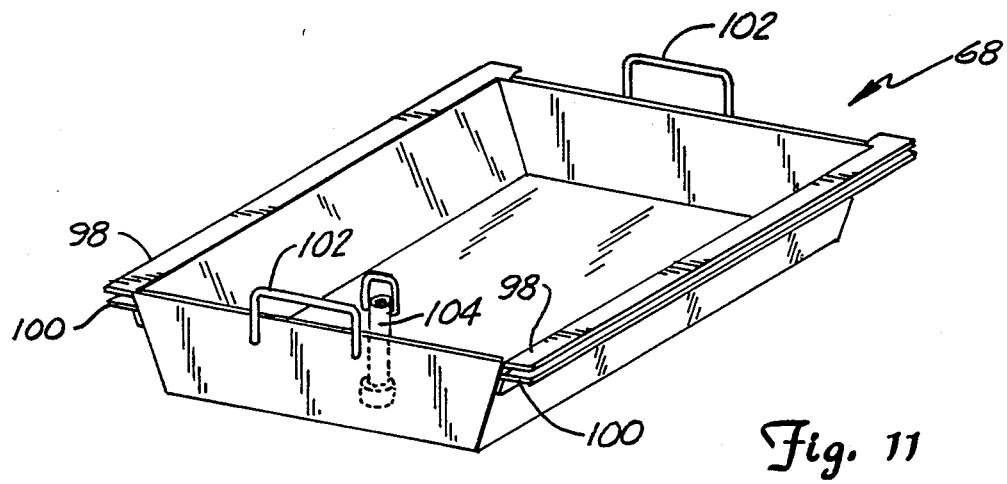
FIG. 11 is a perspective view of the water pan.

FIG. 11 shows water and marinade pan 68 in more detail. Water pan 68 is preferably a unitary stainless steel pan formed by cutting, bending and welding. Pan 68 is about four inches deep. A pair of flanges 98 and 100 on each of the opposite edges of pan 68 engage flanges 66 to support pan 68. Handles 102 connected to the front of pan 68 assist in its insertion, removal and carrying. Overflow valve 104 prevents overfilling of pan 68.

As shown in FIG. 1, control cabinet 14 is located at the left side of oven 10. The access to the control and indicators, and to the electrical circuitry which controls oven 10 is through front panel 110. Located on control panel 110 are temperature controller C1, process timer TMR, power switch 116, "roasting" indicator lamp 118, "roasting complete" indicator lamp 120 and cycle complete alarm horn 122.

Located below panel 110 is a shelf storage area for shelves that are not in use. Access to the shelf storage area is through door 124.

Figure 12:
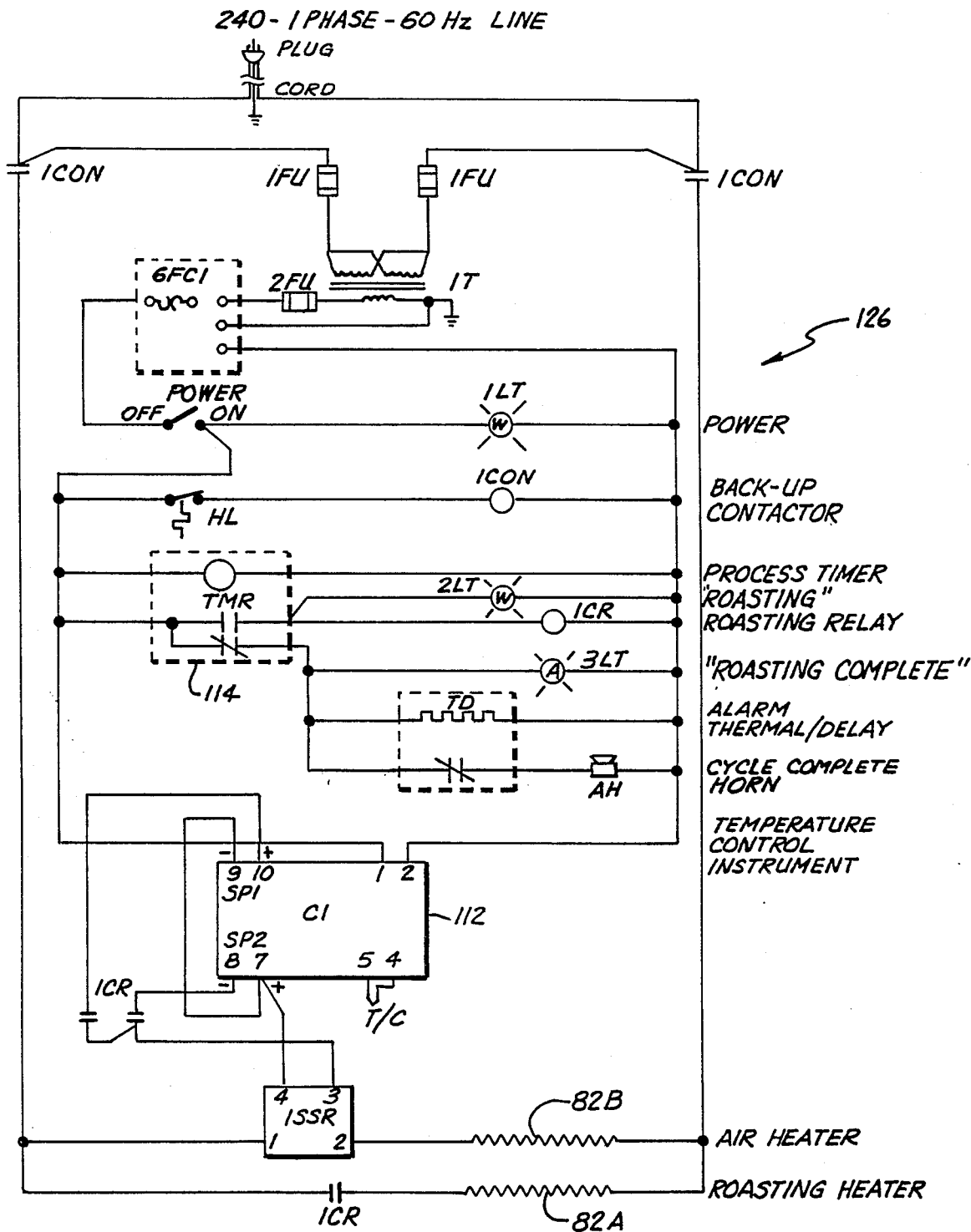
FIG. 12 is an electrical schematic diagram of the electrical control system of the oven.

FIG. 12 is an electrical schematic diagram of control system 126. Operation of system 126 is generally under the control of temperature controller C1 (which is a microprocessor-based CAL 9000 controller), and timer TMR (which is an 813 Series multifunction timer). Controller C1 has a digital display (not shown) for displaying process temperature sensed by thermocouple T/C. Input keys (not shown) permit the cook to select set point temperature. Through solid state relay ISSR, controller C1 controls current to heater element 82B as a function of sensed temperature and the set point temperature.

Timer TMR controls the state of relay ICR, which has contacts which control relay ISSR (and thus heater element 82B) and heater element 82A. Timer TMR has pushbutton switch inputs (not shown) for setting roasting time intervals and a digital display (not shown) for dislaying the time remaining in the interval.

Table 1 lists the components of control system 126 used in a preferred embodiment of the present invention.

TABLE 1

| Item | Description |
| --- | --- |
| C1 | 912.21 Control (CAL 9000) |
| HL | B-200-3-25-330 Thermostat |
| T/C | J39018U-00-16-2060-2(024) T/C |
| 1T | Y050BTZ13JK Transformer 50 VA |
| GFCl | 6590-1 Circuit Breaker 20 amp |
| 1FU | FNM-0.5 250 volt Fusetron |
| 2FU | FRN-0.5 25 volt Fuse |
| 1CON | 2200EB230AA Contactor |
| 1SSR | 50R1D Solid State Relay |
| CORD | 10-3 SEO Cord |
| PLUG | 9333 3-Wire 30 A 250 V Plug |
| 82B | 3.35 KW Heater |
| 82A | 2.4 KW Heater |
| 1SW | LT1LA516SWHWHXBQ1 Switch |
| 1LT | Pilot Light White 120 V |
| 2LT | LTC2NWN1MF Pilot Light White 120 V |
| 3LT | LTC2NAN1MF Pilot Amber 120 V |
| 1CR | 187-32T200 Relay |
| TMR | M813HV Timer |
| TD | 115C12B Thermal Delay 120 V |
| AH | SC110 Alarm Horn 115 V |

At the start of a cooking cycle, the oven is loaded with the food to be cooked, water and marinade pan 68 is filled, and wood tray 64 is filled. The operator selects the time period for which roasting will take place. The temperature typically is controlled to be approximately 200° F. during roasting, and a typical roasting time for meats is approximately six hours. Controller C1 will maintain the roasting temperature by controlling power to heater element 82B until the time set on timer TMR expires. An alarm indicating the end of the roasting period is provided by alarm horn 122 (AH), and "roasting" indicator lamp 118 (2 LT) turns off while roasting complete indicator lamp 120 (3 LT) turns on.

The oven of the present invention offers a number of significant advantages. It provides a large capacity for both cooking and holding foods. It is extremely easy to clean due to the removability of shelf supports 52. The sloped inside floor of the oven assists in the draining of chamber 30 during cleaning.

The oven of the present invention cooks at low temperatures for long periods of time, rather than at high temperatures for short time periods. The disadvantage of a high temperature/short time cooking process is that meats will contract and get tough. By using a low temperature and a long cooking time, the tendons of the meat break down and relax and get buttery in substance.

By providing the self-basting with marinade and steam, the oven of the present invention provides moisture which prevents the food from becoming dry due to the long cooking time. As a result, it is very difficult to overcook food using the oven of the present invention. The cook can be thirty to ninety minutes tardy in removing food from the oven, without ruining the food. In addition, the oven of the present invention can hold the food for long periods of time (on the order of six hours) which significantly reduces waste.

It has been found that product weight loss using the oven of the present invention is on the order of ten to twelve percent. In contrast, ovens using a high temperature and short cooking time during cooking may experience twenty-five to thirty percent weight loss on large cuts of meat. Despite low weight loss, the moisture content of food cooked with the present invention is high. The fat content, however, is low because the fat is roasted out slowly, which does not cause the food to contract and get tough.

With the present invention, it is possible to naturally char the foods as a result of the natural convection airflow over the food. Most smoker units are really sealed chambers which tend to give the food a "mushy" consistency. Since that gray color is not particularly appealing, it is typical to have to cook the food further on a grill before serving it.

The oven of the present invention is not a smoker unit—rather it is a roasting oven which imparts a natural wood flavor into the food during the first part of the cooking process (i.e. approximately the first forty-five minutes). The result is a light wood flavor rather than a heavily smoked flavor.

The use of marinades in pan 68 also provides a unique and simple means for imparting flavor to the food. For example, by using apple juice as a marinade in pan 68, an apple flavor is imparted without having to burn apple wood (which is more expensive).

Although the present invention has been described with reference to preferred embodiments, workers skilled in the art will recognize that changes may be made in form and detail without departing from the spirit and scope of the invention.

What is claimed is:

1. An oven comprising:
   a housing having a top, a bottom, first and second parallel sides, and a back defining a chamber with a front door opening, the housing further having an inlet vent through the bottom and exhaust vent through the top;
   first and second shelf support members removably positionable parallel to and substantially adjacent to the first and second sides respectively, each shelf support member substantially restricting air flow laterally in the chamber and including means for spacing the shelf support member from its respective side for defining a circulation plenum between the shelf support member and its respective side, each support member further having a plurality of vertically spaced, horizontally oriented, inwardly projecting flanges and each support member having at least a first and second openings for permitting gaseous communication through the shelf support member;
   first heating means positioned proximate to the bottom;
   a plurality of cooking racks, each supported between opposing flanges of the first and second shelf support members;
   means for dividing the chamber between the shelf support members into upper and lower portions with the first heating means in the lower portion and the cooking racks in the upper portion and with the first opening in each shelf support connecting a circulation plenum to the lower portion and the second opening in each shelf support connecting a circulation plenum to the upper portion;
   the inlet vent, the lower portion, the circulation plenums, the upper portion and the exhaust vent defining a natural convective path upon operation of the first heating means causing flow of heated gas from areas adjacent the heating means to areas adjacent the cooking racks along the convective path substantially without use of forced air; and
   a front door disposed on the housing for closing the front door opening.

2. The oven of claim 1 and further comprising:

second heating means positioned proximate to the bottom;

a tray for holding wood; and the tray having a pair of outwardly extending side flanges for engaging a first opposed pair of flanges of the first and second shelf support members to position the tray immediately above the second heating means.

3. The oven of claim 2 wherein the second heating means is on continuously during cooking and the first heating means is controlled by a temperature controller to maintain a predetermined temperature in the chamber.

4. The oven of claim 2 wherein the means for dividing the chamber into upper and lower portions further includes a water and marinade pan for holding water and marinade, the water and marinade pan having a pair of outwardly extending side flanges for engaging a second opposed pair of flanges of the first and second shelf support members to position the water and marinade pan immediately above the tray for holding wood.

5. The oven of claim 4 and further comprising:
removable spacer means for holding the first and second shelf support members in spaced apart opposing positions.

6. The oven of claim 5 wherein the removable spacer means comprises a plurality of rods which detachably engage the top ends of the first and second shelf support members.

7. The oven of claim 4 wherein the shelf support members include openings adjacent the tray and below the water pan for permitting smoke from the tray to flow into the circulation plenums.

8. The oven of claim 7 wherein the shelf support members have a plurality of openings for smoke, air, steam and marinade to flow from the passages into a main portion of the chamber.

9. The oven of claim 8 wherein one of the openings is positioned adjacent each of the flanges.

10. The oven of claim 1 and further comprising:
the exhaust vent through the top of the housing being adjustable; and
the inlet vent through the bottom of the housing being adjustable.

11. The oven of claim 10, wherein inner surfaces of the bottom are sloped downward toward the inlet vent to permit draining of liquid out of the chamber through the inlet vent during cleaning of the chamber.

12. An oven comprising:
a housing having a top, a bottom, first and second parallel sides, and a back defining an interior chamber with a front door opening;
an inlet to the chamber through the bottom of the housing and an outlet from the chamber through the top of the housing;
first and second shelf supports positionable through the front door opening in the interior chamber and parallel to the first and second sides, each shelf support being formed of an integrated piecework of appropriate shape and size to divide vertically the interior chamber into a central chamber and two side circulation plenums;
means for dividing the central chamber into upper and lower portions, each portion being in gaseous communication with the side circulation plenums through openings through the shelf supports adjacent the respective portion; and heating means located in the lower portion of the chamber and heating air in the lower portion to establish flow of air along a natural convection path starting outside of the chamber and passing through the inlet through the bottom of the housing to the lower portion, from the lower portion into the side circulation plenums, upward in the side circulation plenums, out of the side circulation plenums through openings in the shelf supports into the upper portion of the chamber, and out of the upper portion of the chamber through the exhaust through the top of the housing.

13. An oven comprising:
a housing having a top, a bottom, first and second parallel sides, and a back defining a chamber with a front door opening;
slidably removable members positionable in the chamber through the front door opening along and spaced from the first and second parallel sides for defining a circulation plenum along each of said parallel sides, each removable member having openings permitting gaseous communication between the chamber and the circulation plenum associated with the removable member;
each removable member including a one piece metal sheet of substantially rectangular shape, opposite edges of the sheet being bent into C-shaped channels, the channels being oriented toward the nearer parallel wall for spacing the unbent portion of sheet between the channels from the wall;
means for dividing the chamber into upper and lower portions, each portion being in gaseous communication with the circulation plenums through openings in the removable members adjacent the respective portion; and
heating means located in the lower portion of the chamber whereby air heated in the lower portion of the chamber rises to the upper portion of the chamber primarily through the circulation plenums.

14. The oven of claim 13, wherein the removable members further include:
a plurality of vertically spaced, horizontally oriented flanges, pairs of flanges from removable members positioned along the parallel walls being horizontally aligned; and
each flange having an opening through the removable member associated therewith.

15. The oven of claim 14 and further comprising:
a plurality of heating racks, each rack being supportable between horizontally aligned flanges.

16. The oven of claim 15 wherein the means for dividing the chamber into upper and lower portions is a water tray supported between a pair of horizontally aligned flanges.

17. The oven of claim 16 wherein the heating means includes first and second electric heat sources.

18. The oven of claim 17 and further comprising a tray for holding wood, supported between a pair of horizontally aligned flanges in the lower portion of the chamber immediately over the second electric heat source.

19. The oven of claim 13 wherein each removable member is sized to bring opposed C-shaped channels snugly against the bottom and the top of the chamber for supporting the removable member in the chamber, while allowing the member to slide along the bottom of the chamber for removing and replacing the removable member in the chamber.

20. The oven of claim 19 wherein the C-shaped channel along the top of each removable member has a plurality of horizontally spaced open faced detentions.

21. The oven of claim 20 wherein the removable members are further fixed in position in the oven by spacing rods removably resting in a pair of opposite open faced detentions.

22. The oven of claim 13 and further comprising a water tray removably supported between the removable members for dividing the chamber into upper and lower portions.

23. An oven comprising:
- a housing having a top, a bottom, first and second parallel sides, and a back defining a chamber with a front door opening;
- first and second rack support members positioned parallel to the first and second sides in opposing positions, each rack support member being spaced from its respective side and shaped and sized for defining a partially closed circulation plenum between the rack support member and the inner wall;
- a front door disposed on the housing for closing the front door opening;
- a water and marinade pan for holding water and marinade suspended between the first and second shelf support members for dividing the chamber into upper and lower portions;
- a plurality of cooking racks supported by the rack support members in the upper portion of the chamber;
- a first heater in the lower portion of the chamber;
- a second heater in the lower portion of the chamber;
- a tray for holding wood;
- means for supporting the tray immediately above the first heater in the lower portion of the chamber;
- each rack support member having a plurality of openings between the circulation plenum and the lower portion and the upper portion for permitting heated air to pass from the lower portion through the circulation plenum to the upper portion by natural convection; and
- control means for controlling the first and second heaters.

24. The oven of claim 23 wherein the control means causes the first heater to be on continuously during cooking and causes the second heater to turn off and on as a function of a sensed temperature to maintain a predetermined temperature in the chamber.

25. The oven of claim 23 and further comprising:
- adjustable exhaust vent means in the top of the housing; and
- adjustable air inlet vent means in the bottom of the housing.

* * * * *